United States Patent
Anca

(10) Patent No.: US 10,259,658 B2
(45) Date of Patent: Apr. 16, 2019

(54) CONVEYOR WITH ACCUMULATION TABLE

(71) Applicant: NJM Packaging Inc.

(72) Inventor: Dan-Constantin Anca, Pierrefonds (CA)

(73) Assignee: NJM PACKAGING INC., Quebec (CA)

( * ) Notice: Subject to any disclaimer, the term of this patent is extended or adjusted under 35 U.S.C. 154(b) by 0 days.

(21) Appl. No.: 15/796,963

(22) Filed: Oct. 30, 2017

(65) Prior Publication Data

US 2018/0118464 A1    May 3, 2018

Related U.S. Application Data

(60) Provisional application No. 62/416,460, filed on Nov. 2, 2016.

(51) Int. Cl.
| | | |
|---|---|---|
| *B65G 41/00* | (2006.01) | |
| *B65G 21/06* | (2006.01) | |
| *B65G 47/68* | (2006.01) | |
| *B65G 47/51* | (2006.01) | |
| *B65G 17/08* | (2006.01) | |

(52) U.S. Cl.
CPC ........... *B65G 41/008* (2013.01); *B65G 21/06* (2013.01); *B65G 41/006* (2013.01); *B65G 47/5104* (2013.01); *B65G 47/5145* (2013.01); *B65G 47/684* (2013.01); *B65G 17/08* (2013.01); *B65G 2201/0244* (2013.01); *B65G 2203/0241* (2013.01); *B65G 2207/30* (2013.01)

(58) Field of Classification Search
CPC ........ B65G 15/12; B65G 21/00; B65G 21/06; B65G 21/10; B65G 41/00; B65G 41/006; B65G 41/007; B65G 41/008; B65G 47/51–47/5131; B65G 47/5145; B65G 47/684; B65G 47/69; B65G 2201/0244; B65G 2203/0241; B65G 2207/30; B65G 17/08
USPC ................................ 198/347.1, 860.1, 860.2
See application file for complete search history.

(56) References Cited

U.S. PATENT DOCUMENTS

| | | |
|---|---|---|
| 995,379 A | 6/1911 | Schwab |
| 1,852,322 A | 4/1932 | Loew |
| 2,303,755 A | 12/1942 | Newton |
| 2,763,359 A * | 9/1956 | Rose ............... B65G 47/684 198/417 |
| 3,102,630 A | 9/1963 | Back |
| 3,176,821 A | 4/1965 | Eldred |
| 3,232,411 A | 2/1966 | Kulig |
| 3,339,700 A | 9/1967 | Wells |
| 3,342,012 A | 9/1967 | Reading |
| 3,604,551 A | 9/1971 | Fink |
| 3,650,371 A | 3/1972 | Constable |
| 4,058,217 A | 11/1977 | Vaughan |

(Continued)

FOREIGN PATENT DOCUMENTS

DE    102012201641 A1 *  8/2013  ............. B65G 23/00

*Primary Examiner* — Gene O Crawford
*Assistant Examiner* — Keith R Campbell
(74) *Attorney, Agent, or Firm* — Thompson Hine LLP

(57) ABSTRACT

A conveying system includes a conveyor for moving items along a primary conveyance path. A first buffer table is releasably connected at a first lateral side of the conveyor, and a second buffer table is releasably connected at a second lateral side of the conveyor.

19 Claims, 14 Drawing Sheets

(56) References Cited

U.S. PATENT DOCUMENTS

| | | | | |
|---|---|---|---|---|
| 4,252,232 | A | 2/1981 | Beck | |
| 4,356,908 | A | 11/1982 | Embro, Jr. | |
| 4,397,384 | A | 8/1983 | Nohren, Jr. | |
| 4,401,207 | A * | 8/1983 | Garvey | B65G 47/684 198/347.4 |
| 4,413,724 | A | 11/1983 | Fellner | |
| 4,446,670 | A | 5/1984 | Compagnoni | |
| 4,513,858 | A | 4/1985 | Fellner | |
| 4,690,751 | A | 9/1987 | Umiker | |
| 5,079,896 | A | 1/1992 | Langen | |
| 5,282,525 | A | 1/1994 | Covert | |
| 5,348,061 | A | 9/1994 | Riley | |
| 5,372,238 | A | 12/1994 | Bonnet | |
| 5,414,974 | A | 5/1995 | Van de Ven | |
| 5,551,551 | A | 9/1996 | Crawford | |
| 5,673,783 | A | 10/1997 | Radant | |
| 5,769,204 | A | 6/1998 | Okada | |
| 5,771,657 | A | 6/1998 | Lasher | |
| 6,056,107 | A | 5/2000 | Schuitema | |
| 6,076,683 | A | 6/2000 | Okada | |
| 6,168,005 | B1 | 1/2001 | Petrovic | |
| 6,206,174 | B1 | 3/2001 | Koltz | |
| 6,401,936 | B1 | 6/2002 | Isaacs | |
| 6,412,621 | B1 | 7/2002 | De Vree | |
| 6,575,287 | B2 | 6/2003 | Garvey | |
| 6,612,417 | B2 | 9/2003 | Garvey | |
| 6,612,425 | B1 | 9/2003 | Garvey | |
| 6,648,124 | B1 | 11/2003 | Garvey | |
| 6,959,802 | B1 | 11/2005 | Garvey | |
| 6,964,329 | B1 | 11/2005 | DiBianca | |
| 7,111,723 | B2 | 9/2006 | Petrovic | |
| 7,198,147 | B2 | 4/2007 | Petrovic | |
| 7,222,718 | B2 | 5/2007 | Tarlton | |
| 7,252,186 | B2 | 8/2007 | Paquin | |
| 7,322,459 | B2 | 1/2008 | Garvey | |
| 7,441,645 | B2 | 10/2008 | Paquin | |
| 7,926,642 | B2 | 4/2011 | Huttner | |
| 8,573,380 | B2 | 11/2013 | Petrovic | |
| 8,770,377 | B2 | 7/2014 | Seger | |
| 9,090,406 | B2 * | 7/2015 | Lopez | B65G 21/22 |
| 9,212,008 | B2 | 12/2015 | Steeber | |
| 9,248,982 | B2 | 2/2016 | Eberhardt | |
| 9,382,076 | B1 | 7/2016 | Earling | |
| 9,394,117 | B2 | 7/2016 | Hanselman | |
| 9,505,562 | B2 | 11/2016 | Petrovic | |
| 9,670,007 | B2 * | 6/2017 | Beesley | B65G 15/12 |
| 9,688,482 | B2 | 6/2017 | Beesley | |
| 9,714,144 | B2 | 7/2017 | Earling | |
| 2005/0167239 | A1 | 8/2005 | Tarlton | |
| 2010/0133069 | A1 * | 6/2010 | Senn | B23Q 7/1447 198/583 |

* cited by examiner

CONVEYOR WITH ACCUMULATION TABLE

TECHNICAL FIELD

This application relates generally to conveying systems used in the packaging industry and, more specifically, to a conveying system and accumulation table arrangement.

BACKGROUND

Accumulators and accumulation tables are well known in the art of conveyors. Indeed, in production lines where the unfinished products are moved on conveyors from one production machine to another, devices for accumulating the products between consecutive machines must often be installed since the production machines commonly operate at different speeds or may have to be momentarily stopped for maintenance.

It would be desirable to provide an accumulation table arrangement that facilitates inspection, service and cleaning.

SUMMARY

In one aspect, a conveying system includes a conveyor for moving items along a primary conveyance path. A first buffer table is releasably connected at a first lateral side of the conveyor, and a second buffer table is releasably connected at a second lateral side of the conveyor.

In another aspect, a conveying system includes a conveyor for moving items along a primary conveyance path. A first buffer table is releasably connected at a first side of the conveyor via a first releasable latch arrangement that includes at least one latch part mounted on the first buffer table and at least one latch part mounted on the conveyor, and at least one electrical connector arrangement that includes at least one connector part mounted on the first buffer table and at least one connector part mounted on the conveyor. A second buffer table is releasably connected at a second side of the conveyor via a second releasable latch arrangement that includes at least one latch part mounted on the second buffer table and at least one latch part mounted on the conveyor, and at least one electrical connector arrangement that includes at least one connector part mounted on the second buffer table and at least one connector part mounted on the conveyor.

In a further aspect, a conveying system includes a conveyor for moving items along a primary conveyance path. A buffer table is releasably connectable at a first side of the conveyor via a releasable latch arrangement that includes a first latch part mounted on the buffer table and second latch part mounted on the conveyor, and at least one electrical connector arrangement that includes a first connector part mounted on the buffer table and a second connector part mounted on the conveyor.

The details of one or more embodiments are set forth in the accompanying drawings and the description below. Other features, objects, and advantages will be apparent from the description and drawings, and from the claims.

DETAILED DESCRIPTION

Figure 1:
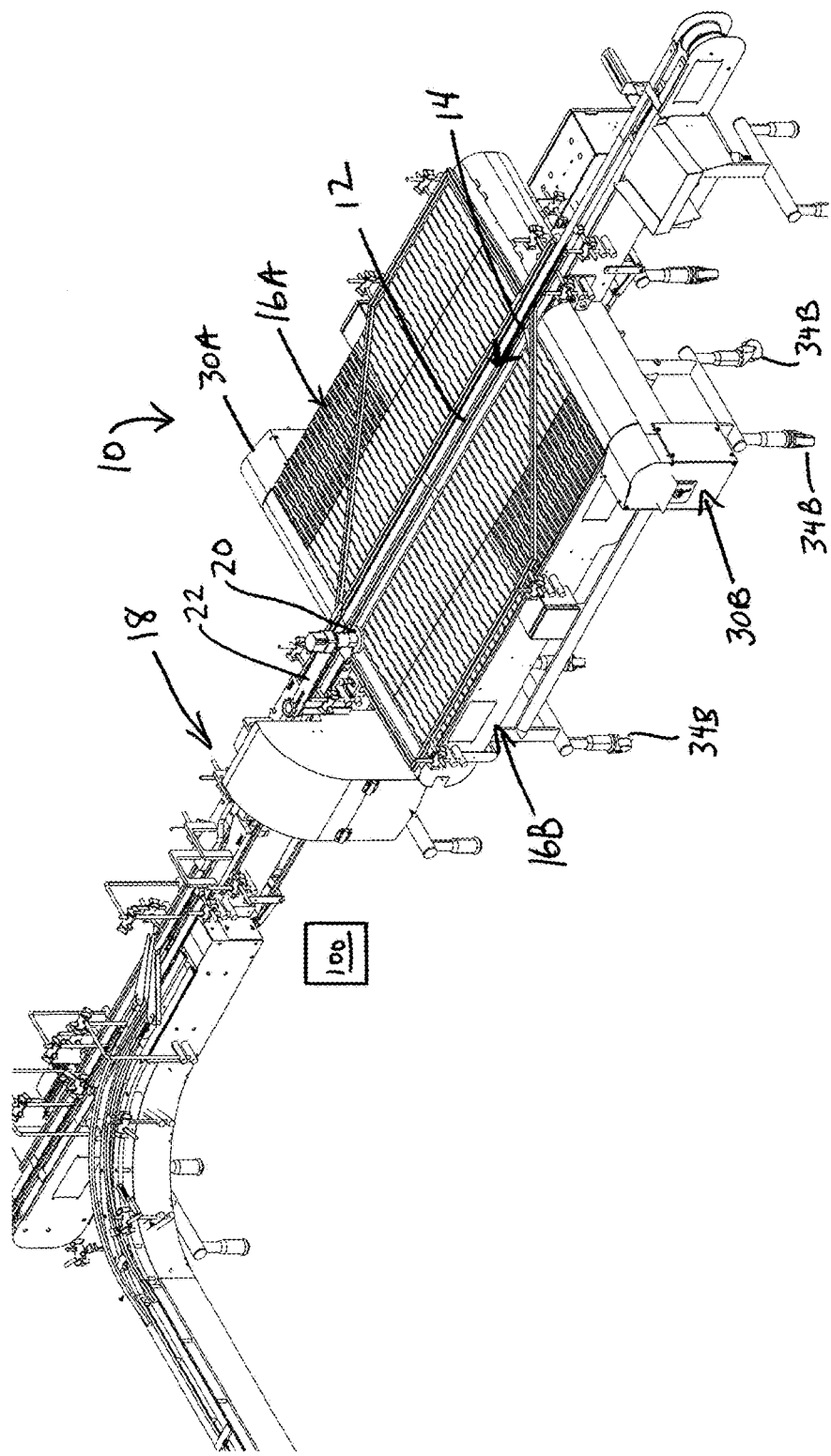
FIG. 1 shows a perspective view of a conveying system.
Figure 2:
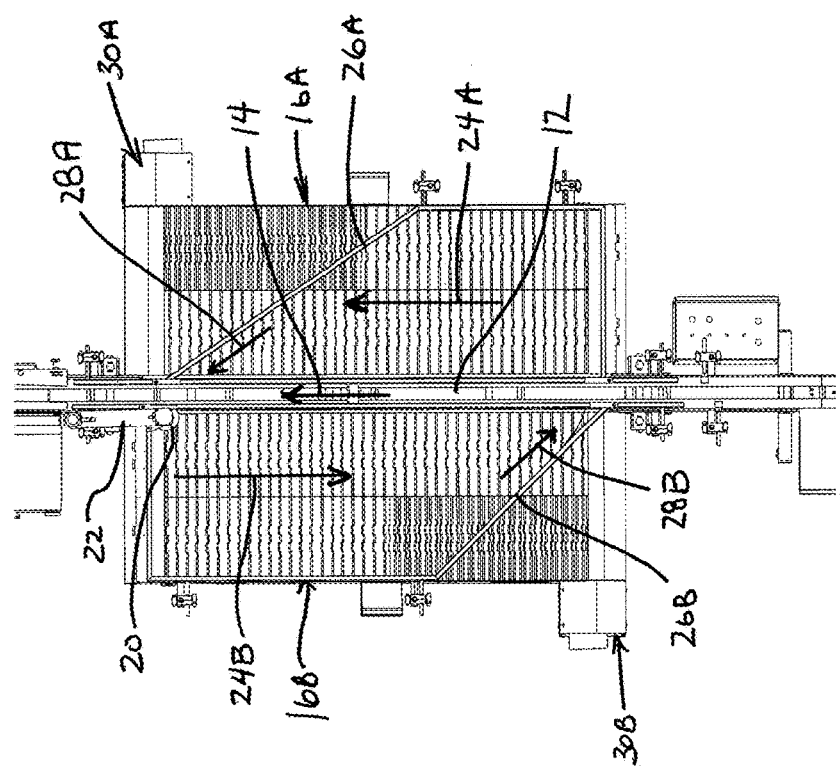
FIG. 2 shows a top plan view of the accumulation portion of the conveying system.

Referring to FIGS. 1-17, a conveying system 10 includes a primary conveyor 12 for moving items along a primary conveyance path (e.g., in the direction of arrow 14). Buffer tables 16A and 16B are releasably connected at opposite sides of the conveyor 12. The system includes a downstream section 18 as well. By way of example, the conveying system 10 may be used for conveying bottles (e.g., pill bottles), though other items could likewise be conveyed.

As mentioned above, in conveying systems it is occasionally necessary to temporarily stop flow to the downstream section 18, but it is preferred not to stop the upstream portions of the line. The buffer tables 16A, 16B create an accumulation table arrangement for this purpose. In particular, during accumulation a transfer wheel 20 mounted on a transfer arm 22 is moved into the main conveyance path to block downstream flow and kick product onto the buffer table 16B, where the conveyor of buffer table 16B flows the product in the direction of arrow 24B back toward the upstream end of the accumulation zone. A guide rail 26B on the buffer table 16B directs the product flow back toward the primary conveyor per arrow 28B. Any product that is bumped onto the buffer table 16A is moved by the conveyor of buffer table 16A in the direction of arrow 24A toward the downstream end of the accumulation zone and a guide rail 26A directs the product flow back toward the primary conveyor per arrow 28A. In this illustrated embodiment the system creates a generally counterclockwise accumulation flow when viewed from the top as in FIG. 2, but other item flow/travel patterns are possible.

Figure 3:
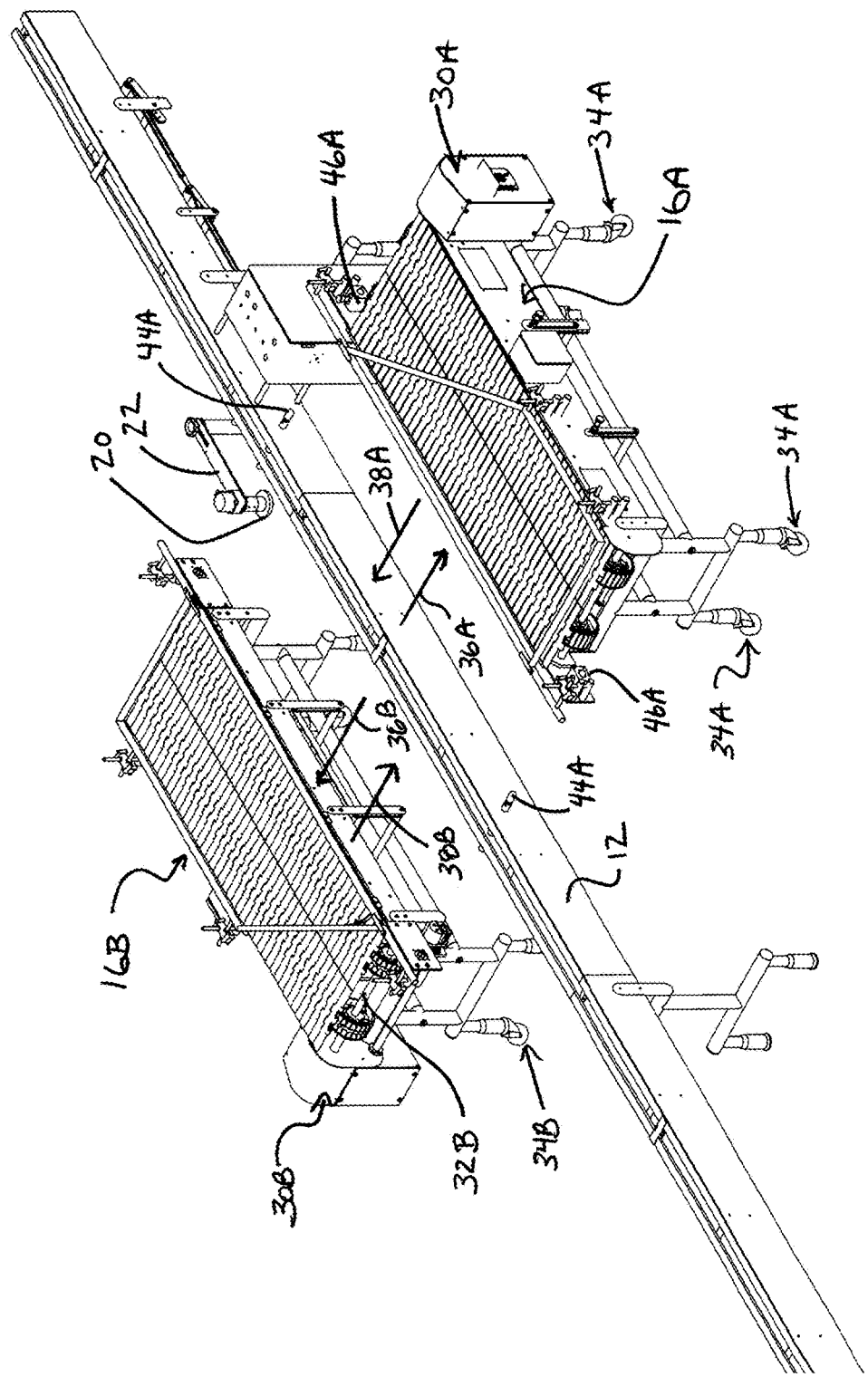
FIG. 3 shows a perspective view of the accumulation portion with buffer tables separated from the primary conveyor.
Figure 7:
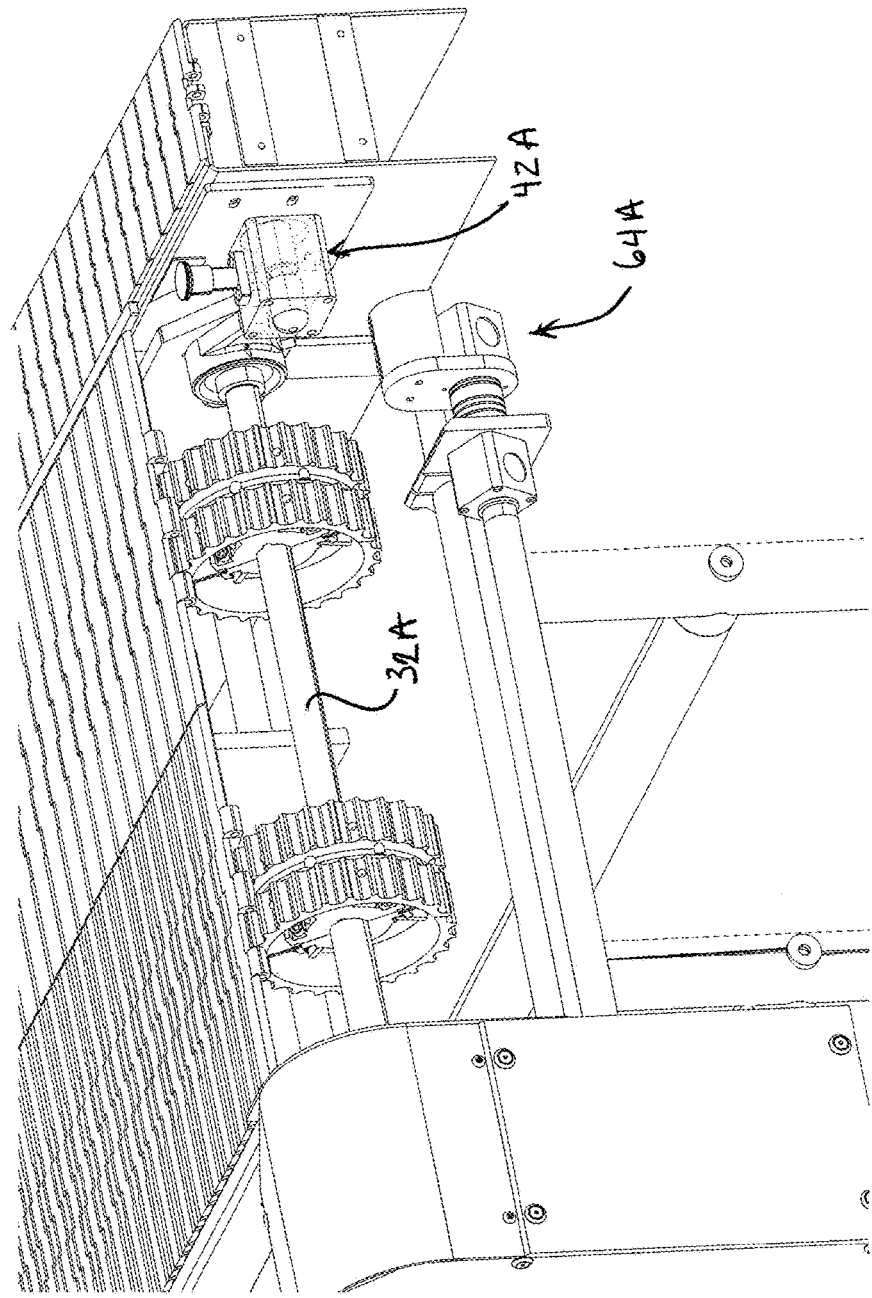
Figure 8:
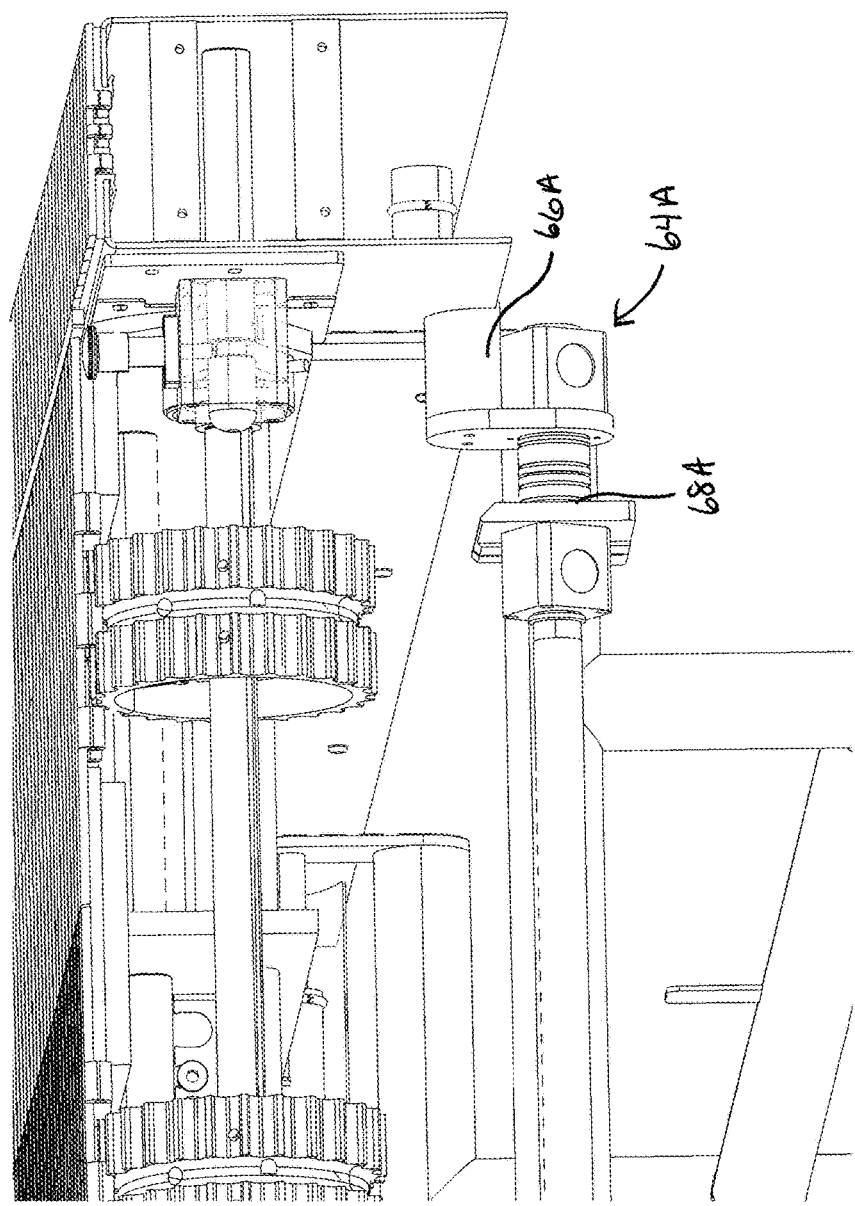

Each buffer table includes a conveyor drive arrangement 30A, 30B, such as a motor with associated components (e.g., gearing) to rotate a drive shaft linked the conveyor at one end of the table (e.g., per drive shaft 32B in FIG. 3 and drive shaft 32A in FIG. 7). Each buffer table may also include one or more sensors for various purposes. For example, one or more sensors (e.g., mechanical, optical or electromagnetic) may be included on each buffer table for detecting when the buffer table is full. In such cases, the controller for the system (e.g., shown schematically in FIG. 1 as component 100) may shut down both the buffer tables and the primary conveyor. In addition one or more sensors (e.g., mechanical, optical or electromagnetic) may be included on the buffer table for detecting when one or more portions of the table is not in an operating position (e.g., in implementation sin which the buffer table includes a mechanism for lowering down the conveyor for inspection, such lowering could be detected). In such cases the controller for the system may prevent operation of the buffer table(s) and/or cease operation of the primary conveyor (e.g., acting as an interlock). Moreover, one or more motor sensors may also be provided on each buffer table for monitoring operation of the table.

As used herein, the term controller is intended to broadly encompass any circuit (e.g., solid state, application specific integrated circuit (ASIC), an electronic circuit, a combinational logic circuit, a field programmable gate array (FPGA)), processor(s) (e.g., shared, dedicated, or group—including hardware or software that executes code), software, firmware and/or other components, or a combination of some or all of the above, that carries out the control functions of the conveying system or the control functions of any component thereof.

As mentioned above, each buffer table is releasably connected to the central conveyor 12. Notably, each buffer table is supported by a respective set of wheels 34A, 34B that enables the buffer table to be easily pulled away from the conveyor (e.g., per arrows 36A, 36B in FIG. 3) when desired and then easily pushed back toward (e.g., per arrows 38A, 38B in FIG. 3) into engagement with the conveyor 12 when desired. In the illustrated embodiment caster wheels are utilized, but other variations are possible. In addition, one or more of the wheels of each buffer table could include a manual locking mechanism (e.g., a foot actuated lock) for added stability when the buffer table is engaged with the conveyor 12.

Figure 4:
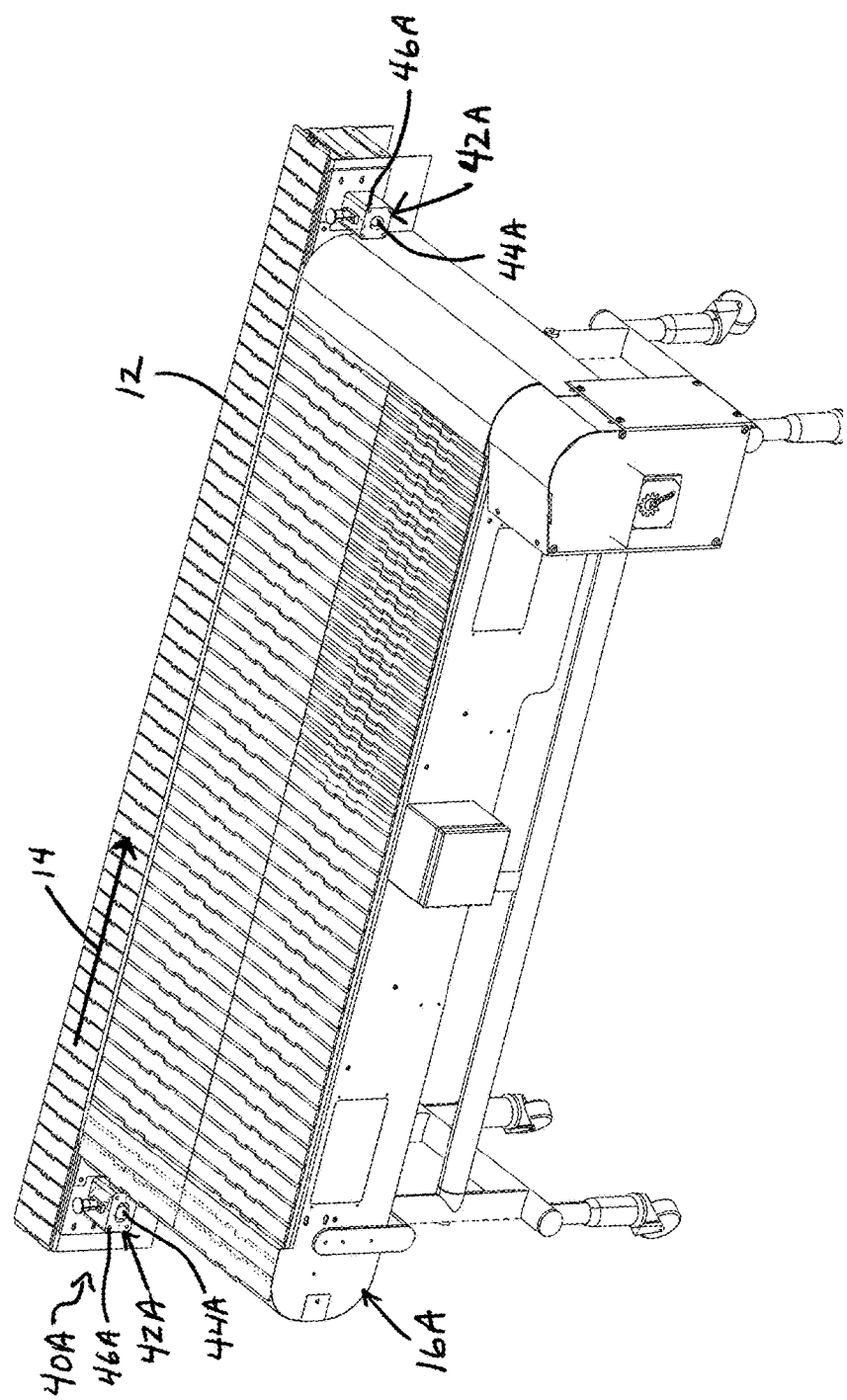
FIG. 4 shows a perspective view of one buffer table at one side of the primary conveyor.
Figure 5:
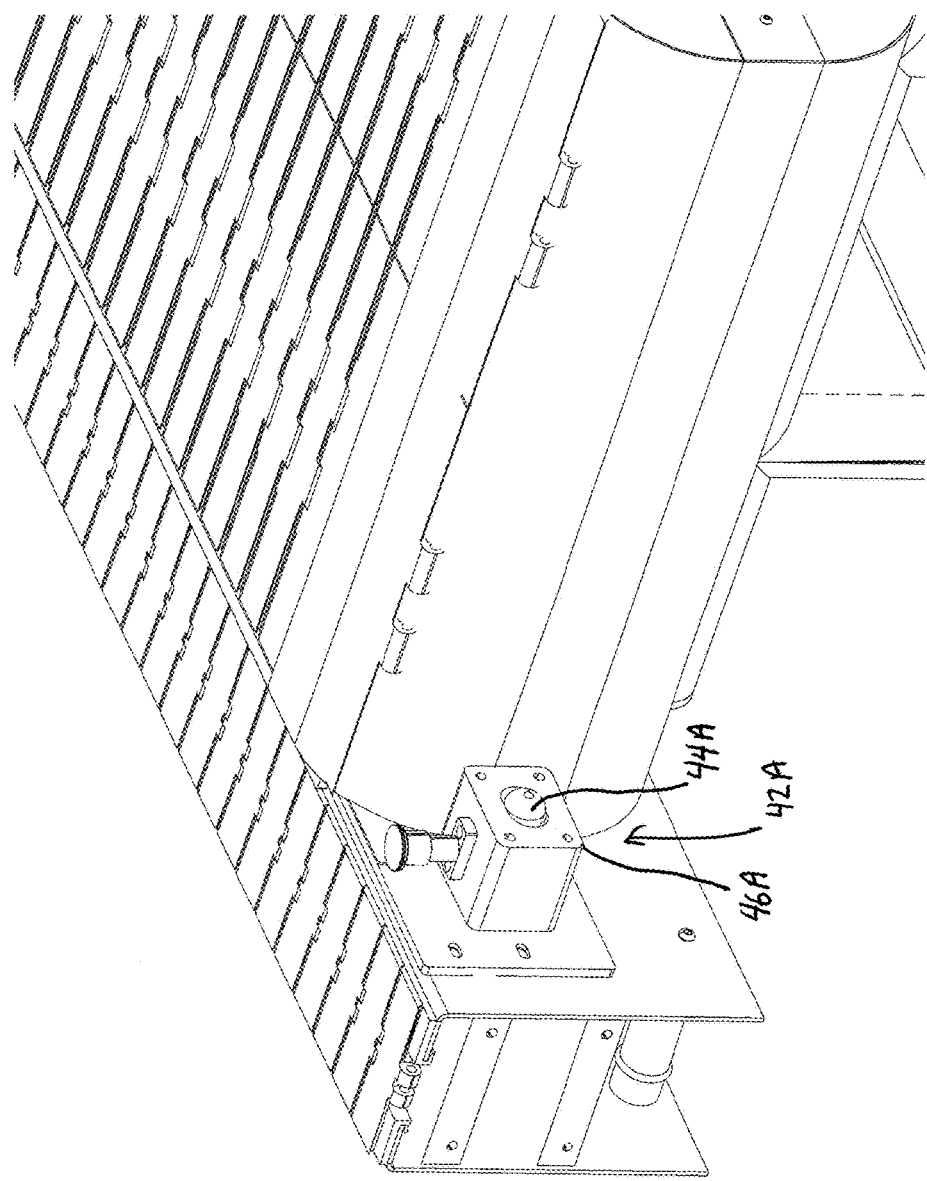
FIG. 5 shows an enlarged view of one end of the buffer table of FIG. 4.
Figure 6:
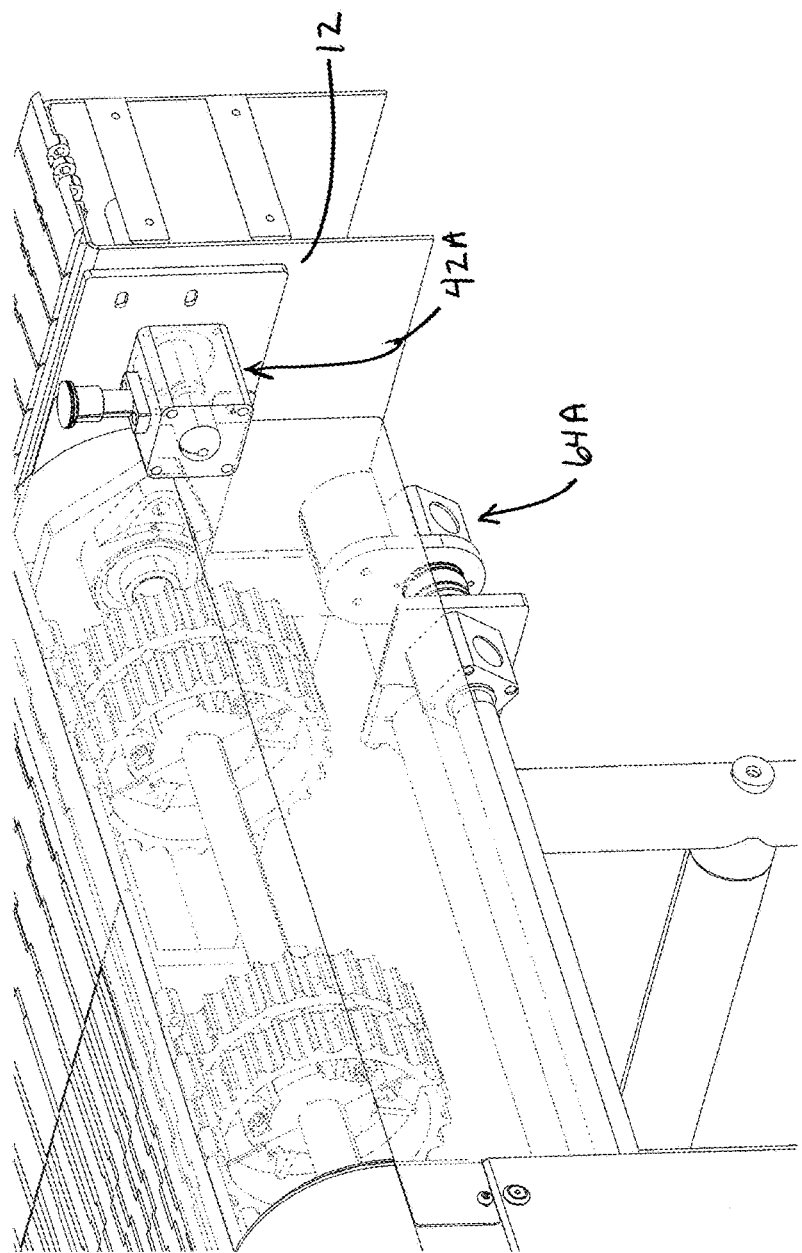
FIGS. 6-8 show enlarged views of the opposite end of the buffer table of FIG. 4.

A latch arrangement releasably connects each buffer table to its respective side of the conveyor 12. Referring to FIG. 4, where the latch arrangement 40A for buffer table 16A is viewable, the latch arrangement includes two sets of mating latch components 42A at the upstream and downstream ends of the buffer table. Each set of mating latch components includes a male latch part 44A and a female latch part 46A, where the male latch parts 44A are fixed to the side of the conveyor 12 and the female latch parts 46A are fixed to the buffer table. However, it is understood that the relative positions of the male and female latch parts could be reversed. The spacing between the male latch parts 44A on the conveyor and the female latch parts on the buffer table is matched to allow mating of the parts when the buffer table 16A is slid toward the side of the conveyor.

Figure 9:
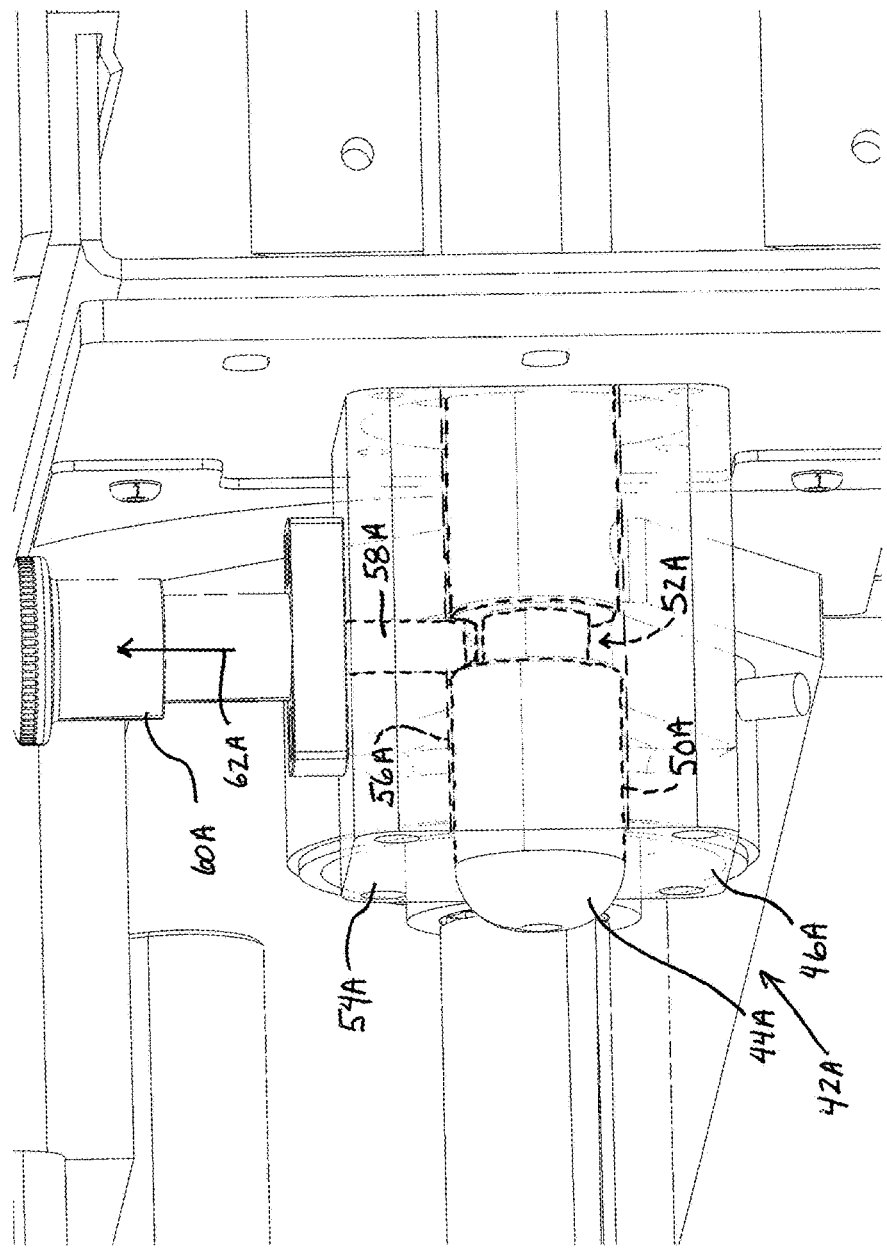
FIG. 9 shows an enlarged view of a latch arrangement between the buffer table and the primary conveyor.
Figure 10:
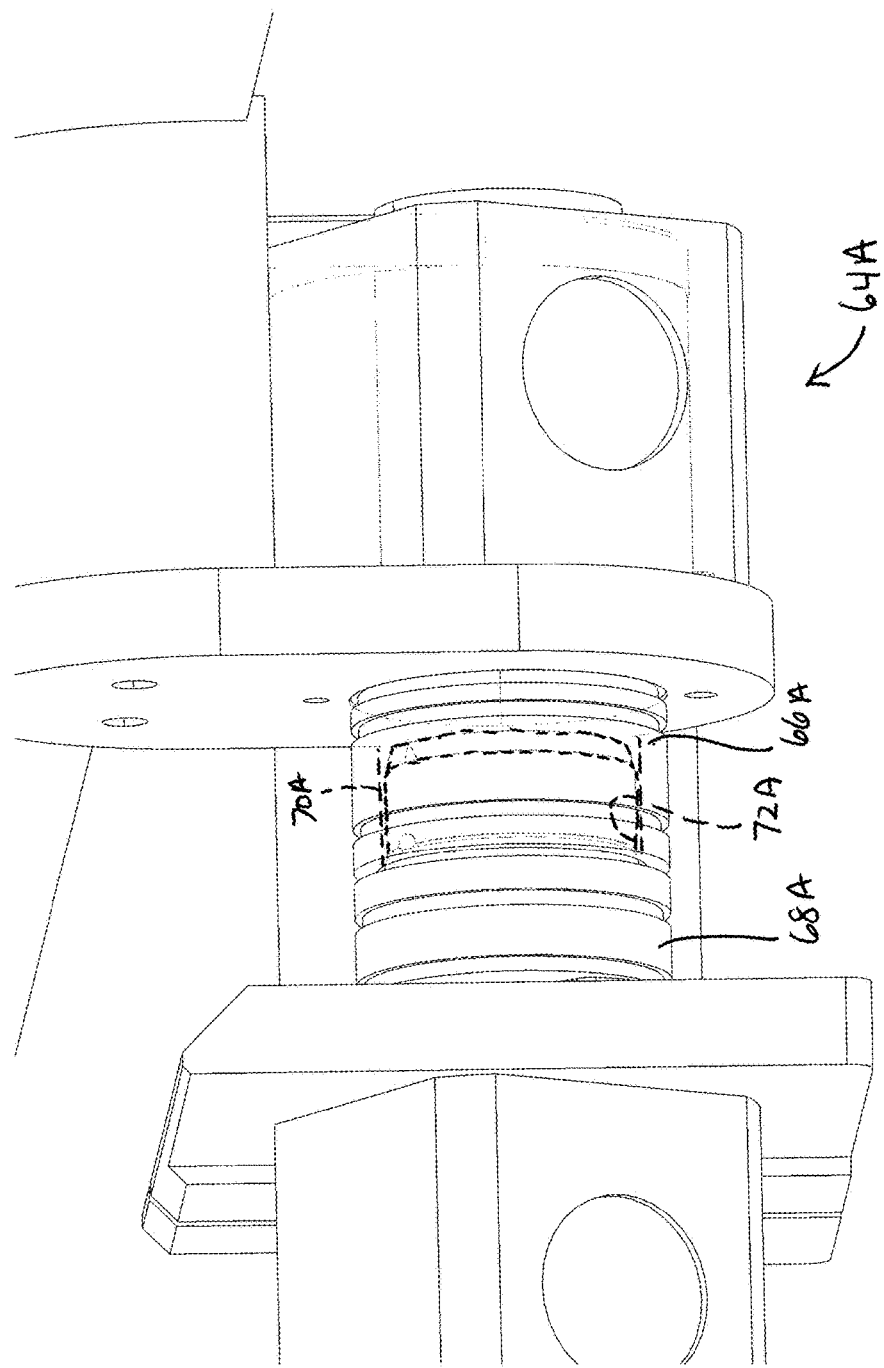
FIG. 10 shows an enlarged view of the electrical connection arrangement between the buffer table and the primary conveyor.
Figure 11:
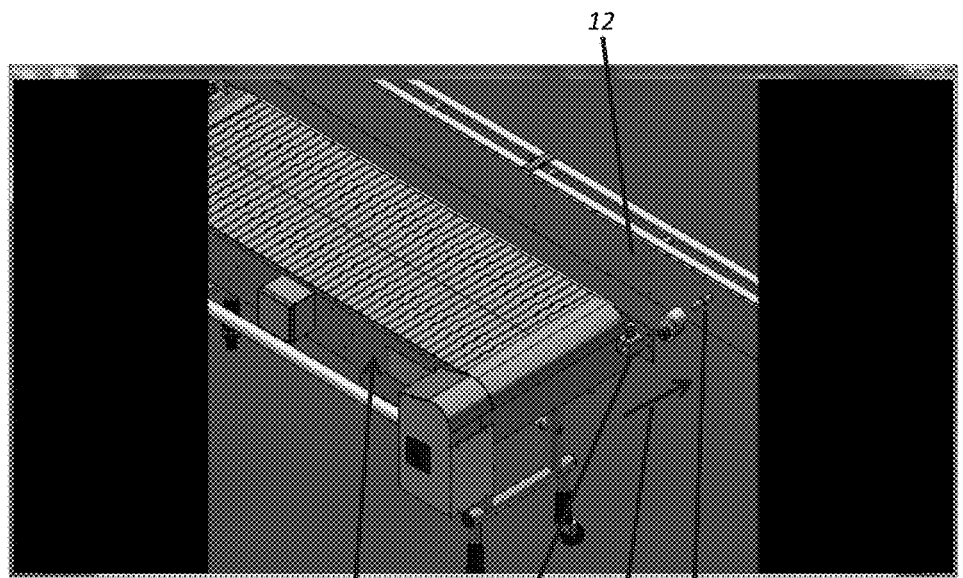
FIGS. 11-17 depict movement of a buffer table into engagement with a side of the primary conveyor.
Figure 12:
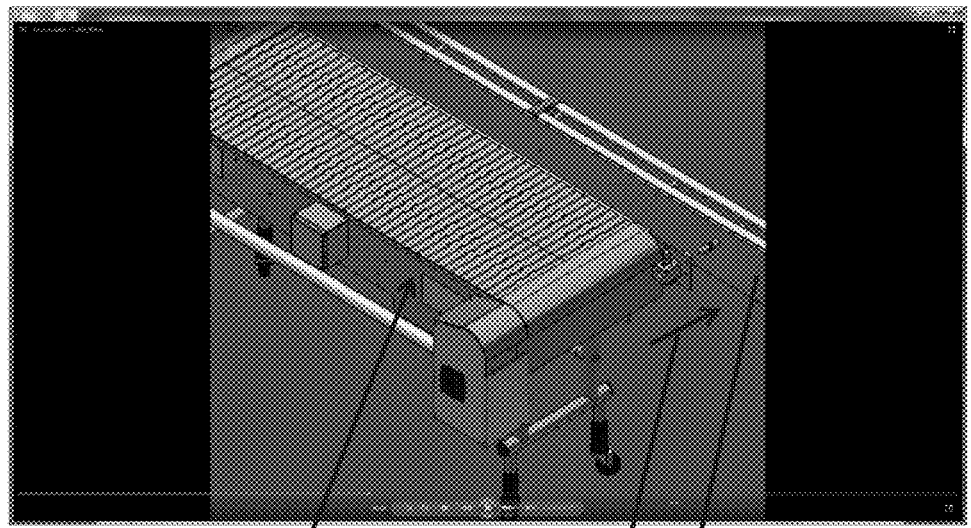
Figure 13:
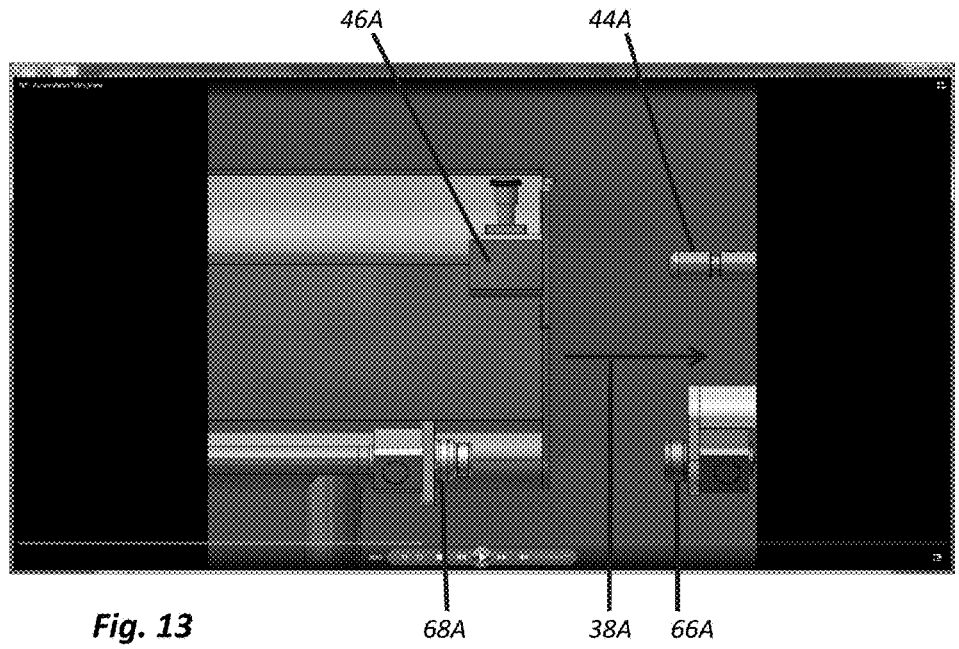
Figure 14:
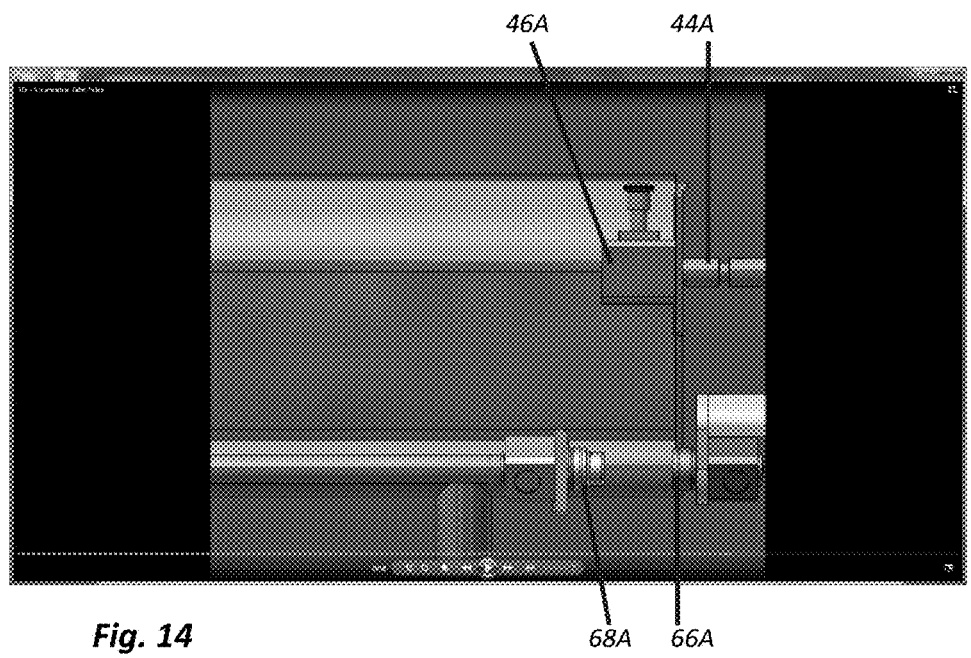
Figure 15:
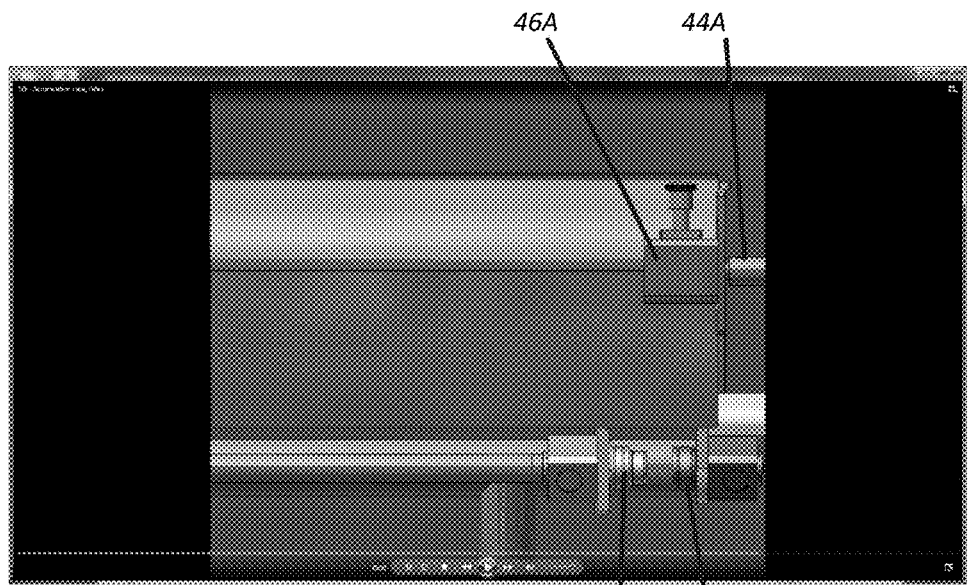
Figure 16:
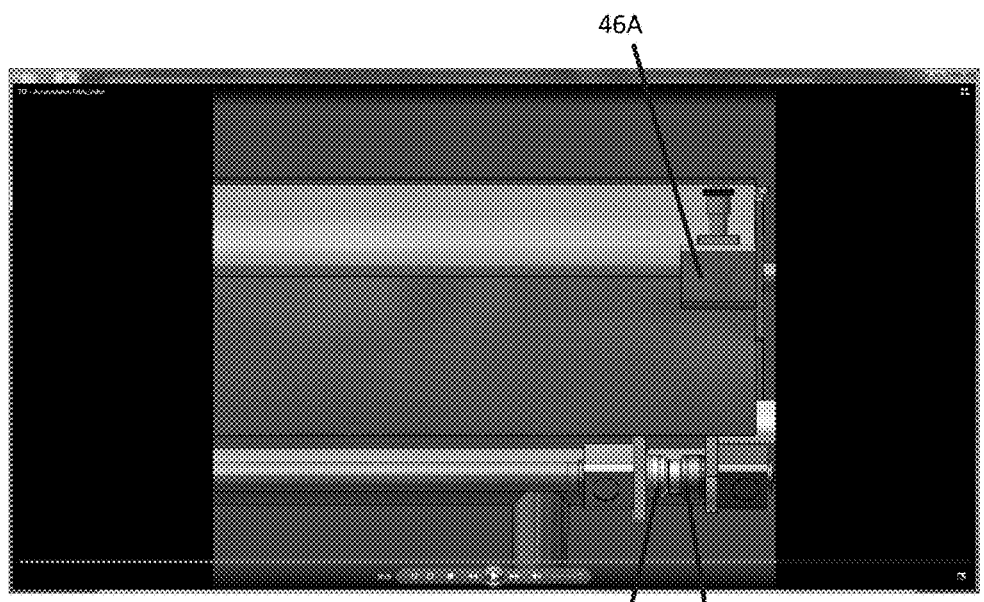
Figure 17:
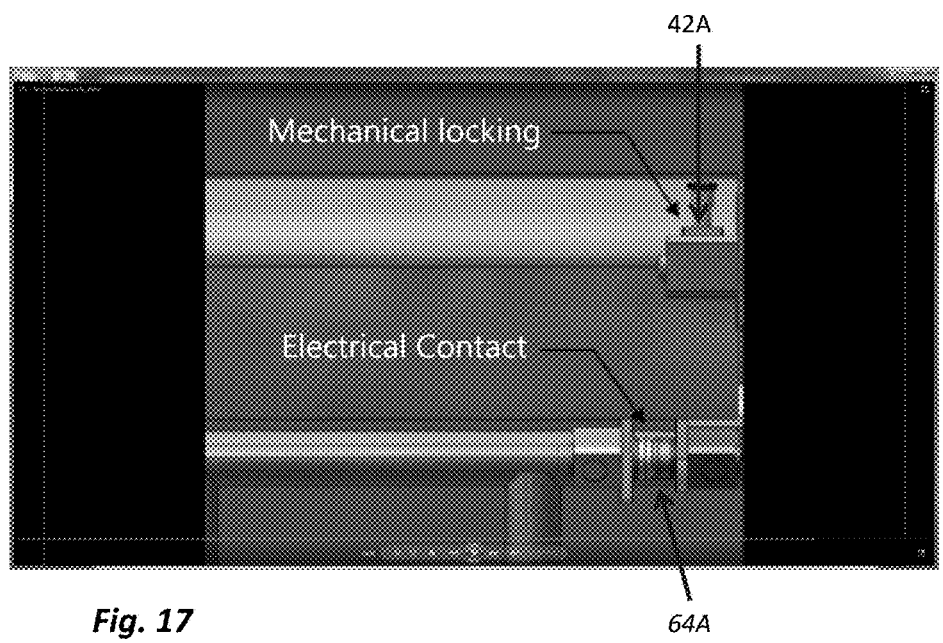

As best seen in FIG. 9, the male latch part 44A may be configured as an elongated member such as a rod member 50A with an external groove 52A. The female latch part 46A may include a housing 54A with a through opening 56A to receive the rod member 50A. The female latch part 46A also includes a pin member 58A movable radially into and out of the through opening 56A and biased into the illustrated latching position within the opening 56A for engaging with the external groove 52A, forming the latched connection of the two components. An external handle mechanism 60A provides the ability to pull the pin member 58A radially outward (e.g., per arrow 62A) from the groove 52A in order to enable release of the two latch parts. Notably, the free end of the rod member 50A may be curved, tapered or otherwise contoured such that when the rod member 50A moves into the opening 56A the interaction between the end of the rod member 50A and the pin member 58A automatically moves the pin member radially outward until the pin member aligns with the groove 52A and snaps into the latched position within the groove. Thus, the latch parts 44A and 46A are more easily engaged with each other without requiring manual pulling of the handle 60A.

In addition to the latch arrangement between each buffer table and the conveyor, an electrical connection (e.g., 64A in FIGS. 6-8 and 10) may be provided between each buffer table and the conveyor. Each electrical connection may be formed by an electrical connector component 66A located on the side of the conveyor 12 and an electrical connector 68A component located on the buffer table, wherein the two electrical connector components releasably mate with each other. Component 66A may include a free end with a recessed opening 70A that receives a nose 72A at the free end of component 68A. However, the positioning of the nose and opening could be reversed as between the buffer table and the conveyor. Pin and socket electrical contacts engage each other for electrical connection when the nose 72A is seated in the opening 70A. The electrical connections made include a power delivery path (e.g., to provide electrical power to the buffer table drive motor), one or more sensor signal paths (e.g., to enable communication of a conveying system controller and the sensor(s) on the buffer table) and/or one or more control signal paths as needed for selective control of any components of the buffer table. Although only the electrical connection 64A for buffer table 64A is shown and described above, buffer table 16B includes a similar electrical connector arrangement.

By way of example, the electrical connection components may be Part Nos. 18.0211 & 18.0210 (also referred to by the MGK2VB10-14+MGK2R-M25 Type code) available from Multi-Contact AG (www.multi-contac.ocm), though many other variations are possible. The above noted components provide fully insulated socket and pin plastic housings of high-impact material. Each housing may be formed by front and rear parts that are screwed or otherwise secured together. The cylindrical front part of each housing serves for the positioning of the contact carrier and the square rear part for the insertion and mounting of the leads.

FIGS. 11-17 show a sequence of engaging a buffer table with a conveyor by moving the buffer table 16A laterally toward the conveyor with respective latch parts 44A and 46A aligned for engagement. Notably, the latch parts 44A, 46A are configured to assure alignment between the electrical connector parts 66A, 68A when the buffer table is being engaged with the side of the conveyor 12. In particular, and per FIGS. 14 and 15, the latch parts 44A and 46A are sized and positioned to at least initially engage each other before the connector parts 66A and 68A make any engagement with each other. This guiding helps avoid damage of the electrical connector parts that might occur if they are misaligned (e.g., where the electrical connector parts are formed of plastic housings that are more easily damaged than metal and female latch parts of metal).

Notably, the buffer tables 16A and 16B may be of identical configuration and the latch parts and electrical connector parts on opposite sides of the tables similarly positioned such that either table may be releasably connected at either side of the conveyor (e.g., buffer table 16A could be releasably connected at the opposite side of the conveyor where buffer table 16B is located by simply moving buffer table 16A to the opposite side of the table and rotating the buffer table 16A one-hundred eighty degrees to enable engagement with the opposite side of the conveyor).

It is to be clearly understood that the above description is intended by way of illustration and example only, is not intended to be taken by way of limitation, and that other changes and modifications are possible. For example, while the illustrated embodiment contemplates sliding the buffer tables substantially perpendicular to the travel direction of the primary conveyor in order to make a latched connection, it is recognized that other variations are possible. For example, implementations in which a buffer table is initially positioned in abutting contact with the side of the primary conveyor and then moved parallel to the direction of travel of the primary conveyor to achieve a latched connection are also contemplated.

What is claimed is:

1. A conveying system, comprising:
a conveyor for moving items along a primary conveyance path;
a first buffer table releasably connected at a first lateral side of the conveyor;
a second buffer table releasably connected at a second lateral side of the conveyor;
a first latch arrangement releasably engaging the first buffer table with the first lateral side of the conveyor; and
a second latch arrangement releasably engaging the second buffer table with the second lateral side of the conveyor.

2. The conveying system of claim 1 wherein:
the first latch arrangement includes at least one male part and at least one female part, the male part includes a rod member with an external groove, and the female part includes an opening to receive the rod member, the female part further includes a retaining member biased into a latching position within the opening for engaging with the external groove when aligned therewith.

3. The conveying system of claim 1 wherein:
the first buffer table is supported by a plurality of wheel members such that the first buffer table can be pulled away from the conveyor upon release of the first latch arrangement;
the second buffer table is supported by a plurality of wheel members such that the second buffer table can be pulled away from the conveyor upon release of the second latch arrangement.

4. The conveying system of claim 1 wherein:
the first latch arrangement includes a first latching part and a second latching part at spaced apart locations along the first lateral side of the conveyor, and a third latching part and a fourth latching part at spaced apart locations along a first lateral side of the first buffer table, wherein the third latching part is releasably engaged with the first latching part and the fourth latching part is releasably engaged with the second latching part;
the second latch arrangement includes a fifth latching part and a sixth latching part at spaced apart locations along the second lateral side of the conveyor, and a seventh latching part and an eighth latching part at spaced apart locations along a first lateral side of the second buffer table, wherein the seventh latching part is releasably engaged with the fifth latching part and the eighth latching part is releasably engaged with the sixth latching part.

5. The arrangement of claim 1 further comprising:
a first electrical connection between the first lateral side of the conveyor and the first lateral side of the first buffer table, the first electrical connection formed by a first electrical connector component located along the first lateral side of the conveyor and a second electrical connector component located along the first lateral side of the first buffer table, wherein the first electrical connector component is releasably mated to the second electrical connector component;
a second electrical connection between the second lateral side of the conveyor and the first lateral side of the second buffer table, the second electrical connection formed by a third electrical connector component located along the second lateral side of the conveyor and a fourth electrical connector component located along the first lateral side of the second buffer table, wherein the third electrical connector component is releasably mated to the fourth electrical connector component.

6. The conveying system of claim 5 wherein:
the first buffer table includes a conveyor and a conveyor drive and power for the conveyor drive is delivered through the first electrical connection;
the second buffer table includes a conveyor and a conveyor drive, and power for the conveyor drive of the second buffer table is delivered through the second electrical connection.

7. The conveying system of claim 6 wherein:
the first buffer table includes at least one sensor and feedback from the sensor is delivered to a conveying system controller through the first electrical connection;
the second buffer table includes at least one sensor and feedback from the sensor of the second buffer table is delivered to the conveying system controller through the second electrical connection.

8. A conveying system, comprising:
a conveyor for moving items along a primary conveyance path;
a first buffer table releasably connected at a first lateral side of the conveyor via a first releasable latch arrangement including at least one latch part mounted on the first buffer table and at least one latch part mounted on the conveyor, and at least one electrical connector arrangement including at least one connector part mounted on the first buffer table and at least one connector part mounted on the conveyor; and
a second buffer table releasably connected at a second lateral side of the conveyor via a second releasable latch arrangement including at least one latch part mounted on the second buffer table and at least one latch part mounted on the conveyor, and at least one electrical connector arrangement including at least one connector part mounted on the second buffer table and at least one connector part mounted on the conveyor.

9. The conveying system of claim 8 wherein:
the first buffer table is supported by a plurality of wheel members such that the first buffer table can be pulled away from the table upon release of the first releasable latch arrangement;
the second buffer table is supported by a plurality of wheel members such that the second buffer table can be pulled away from the table upon release of the second releasable latch arrangement.

10. The conveying system of claim 8 wherein:
the first releasable latch arrangement includes at least one male latch part and at least one female latch part, the male latch part includes a rod member with an external groove, and the female latch part includes an opening to receive the rod member, the female latch part further includes a retaining member biased into a latching position within the opening for engaging with the external groove when aligned therewith.

11. A conveying system, comprising:
a conveyor for moving items along a primary conveyance path;
a buffer table releasably connectable at a first side of the conveyor via a releasable latch arrangement including a first latch part mounted on the buffer table and a second latch part mounted on the conveyor, and at least one electrical connector arrangement including a first connector part mounted on the buffer table and a second connector part mounted on the conveyor.

12. The conveying system of claim 11 wherein:
the releasable latch arrangement is configured to assure alignment between the first connector part and the second connector part when the buffer table is being engaged with the first side of the conveyor.

13. The conveying system of claim 12 wherein:
as the buffer table is moved into an operating position at the first side of the conveyor, the first latch part and the second latch part are sized and positioned to engage each other before the first connector part and the second connector part engage each other.

14. The conveying system of claim 11 wherein:
the releasable latch arrangement includes a male part and a female part, the first latch part comprises one of the female part or the male part, and the second latch part comprises the other of the female part or the male part.

15. The conveying system of claim 14 wherein:
the male part includes a rod member with an external groove;
the female part includes an opening to receive the rod member, the female part further includes a pin member biased into a latching position within the opening for engaging with the external groove when aligned therewith.

16. The conveying system of claim 15 wherein:
the pin member is manually retractable from its latching position.

17. The conveying system of claim 11 wherein:
the conveyor includes a third latch part located along a second side of the conveyor and a third connector part located along the second side of the conveyor,
and the buffer table is alternatively releasably connectable at the second side of the conveyor via engagement of the third latch part with the first latch part and engagement of the third connector part and the first connector part.

18. The conveying system of claim 11 wherein:
the buffer table includes a conveyor and a conveyor drive and power for the conveyor drive is deliverable through the electrical connector arrangement.

19. The conveying system of claim 18 wherein:
the buffer table includes at least one sensor and feedback from the sensor is deliverable to a conveying system controller through the electrical connector arrangement.

\* \* \* \* \*